Figure 1:
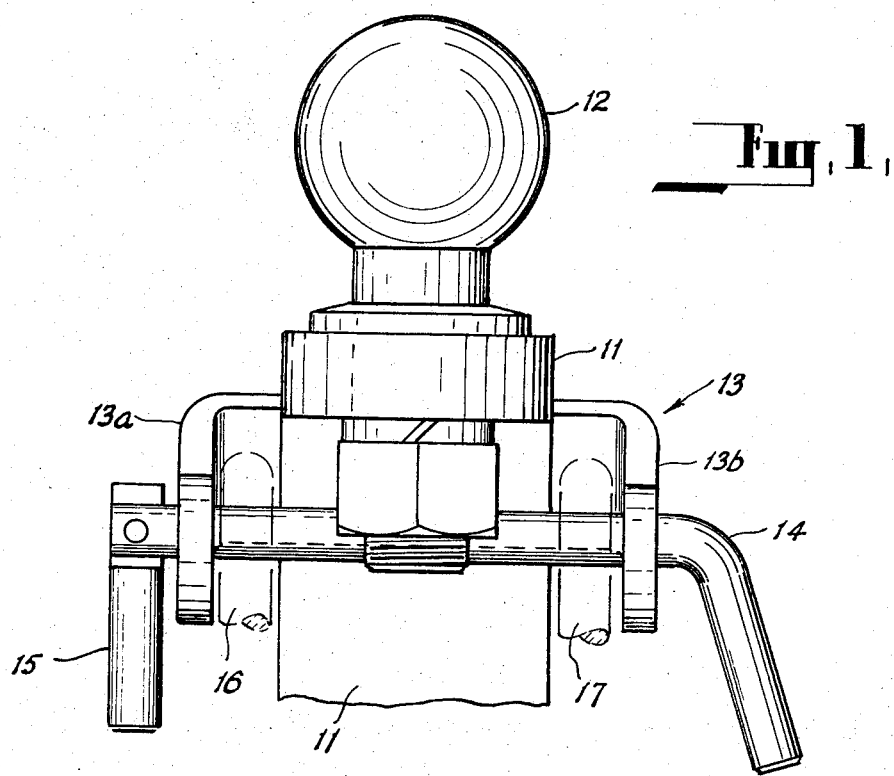

Sept. 12, 1967  B. M. BROUN  3,341,226
DRAW BAR WITH SAFETY CHAIN FOR MOTOR VEHICLES
Filed Nov. 22, 1965

Inventor:
Basil Mafeking Broun
BY Cab Thein.
Agent

United States Patent Office 3,341,226
Patented Sept. 12, 1967

3,341,226
DRAW BAR WITH SAFETY CHAIN FOR
MOTOR VEHICLES
Basil M. Broun, Corner of William and Camberwell Sts.,
Cannington, Western Australia, Australia
Filed Nov. 22, 1965, Ser. No. 509,130
10 Claims. (Cl. 280—457)

This invention relates to improved draw bars for motor vehicles, and more particularly to draw bars connectably with the trailer or the like by way of both conventional coupling means and safety chains.

Traffic regulations require in most countries that when a trailer or a caravan (van) is hitched to a motor behicle it must have, in addition to the normal coupling means, a pair of chains which are connected to the draw bar of the towing vehicle so that if the coupling means should break or become inoperative, the trailer will still remain connected to the towing vehicle by means of the chains.

The ends of the chains are normally connected to the tow or draw bar of the towing vehicle by slipping them on to hook-like members known as rams' horns, welded to the draw bar, or by means of D-shaped shackles positioned in rings fixed to the draw bar or the motor vehicle.

It is one of the objects of the invention to provide a device for facilitating the coupling and decoupling of the chains to the draw bar of the motor vehicle.

It is also an object to provide draw bars which are easily adapted to various types of coupling means and locking pins, and which are easy to manufacture and manipulate.

Broadly, the invention resides in a draw bar for motor vehicles, featuring a pair of arms fixed thereto so that they are substantially parallel and project therefrom in spaced positions; a locking pin is positioned in aligned holes in the arms, said pin being adapted to receive the ends of safety chains fitted to a trailer. Optionally, means are provided for holding the ends of the chains apart when positioned on the locking pin.

The invention furthermore relates to a draw bar wherein a substantially U-shaped bracket is fixed to one face of the draw bar so that the latter is between the arms of the bracket, these arms being substantially parallel and spaced apart from the edges of the draw bar, and having aligned holes, the position of the latter being such that when the locking pin is in position in the holes it is just clear of the face of the draw bar opposite to that to which the bracket is fixed.

According to further features of the invention, a draw bar is provided wherein a first bracket is fixed to one face of the draw bar so that the latter is between the arms of the bracket, and these arms are substantially parallel a second smaller bracket is fixed to the face of the draw bar opposite to that to which the first bracket is fixed, the arms of the second bracket being spaced apart inwardly from the corresponding arms of the first bracket and being provided with holes aligned with the holes in the arms of the first bracket.

The invention also features a draw bar wherein a pair of brackets are fixed, one to each side of the draw bar, so that the arms of each bracket are substantially parallel to the arms of the other bracket and are each provided with aligned holes. In all exemplary embodiments, the locking pin passes through the aligned holes, the pin being adapted to receive the above-mentioned chain ends.

From among the locking pins contemplated to be used with the draw bar according to the invention, one preferred embodiment has a short pivotal portion at one end which allows the pin to pass through the holes, when aligned with the main body of the pin, and which will rotate under its own weight to take up a transverse position, when the pivtotal portion has been passed through the holes.

In another embodiment of the locking pin, one of its ends is threaded for engagement with a corresponding threaded hole in one of the arms in the bracket.

In a third possible embodiment, the end of the locking pin is provided with a transverse hole through which a wire clip can be passed.

Figure 2:
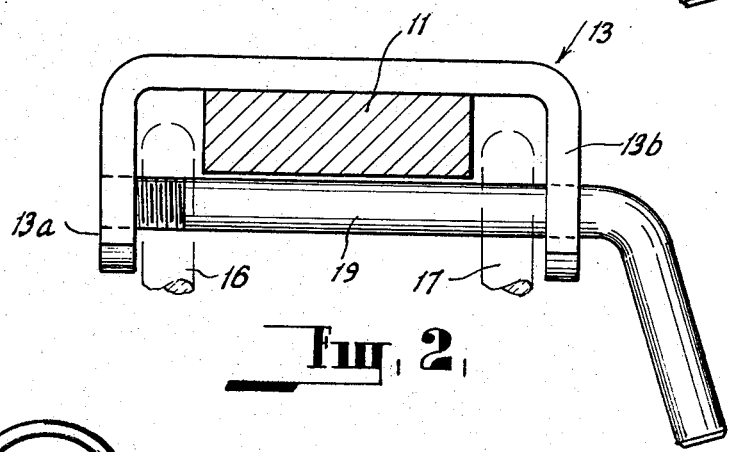
Figure 3:
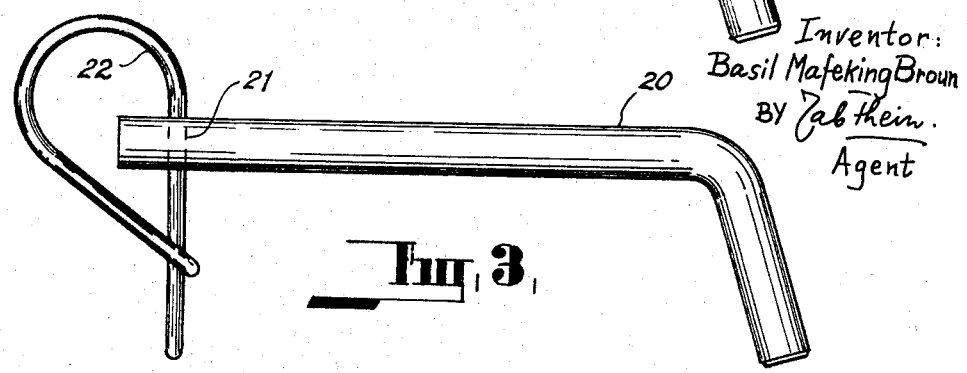

The invention will be better understood by reference to the following description of exemplary, specific embodiments thereof shown in the accompanying drawing, wherein FIG. 1 is an end elevation of one embodiment of the inventive draw bar;

FIG. 2 is an end elevation of a second embodiment, with the draw bar sectioned; and FIG. 3 is an end elevation of a further form of a locking pin which may be used in place of the locking pin shown in the first two embodiments.

In the embodiment shown in FIG. 1, a draw bar 11 (releasably attached to a towing motor vehicle in a conventional manner) is shown, having a goose-neck configuration, the free end having a ball 12 of a conventional coupling means fitted thereto, for attachment of a van or trailer, by the intermediary of appropriate trailer coupling elements (not illustrated).

In accordance with the invention, the base of a substantially U-shaped bracket 13 is fixed to one face (e.g. the upper face) of the draw bar 11 so that the latter is between arms 13a and 13b of the U-shaped bracket and the arms are spaced apart from the edges of the draw bar. A pivotally mounted locking pin 14 is passed through aligned holes in the arms 13a and 13b of the bracket, the position of the holes being such that when the locking pin is in place it is just clear of the face (e.g. the lower face) of the draw bar 11 opposite to that to which the bracket is fixed, as will be clearly seen in FIG. 2 of the drawing.

One end of the locking pin 14 is provided with a short pivotal portion (as shown in FIG. 1) which, when aligned with the main body of the pin, will allow the pin to pass through the holes in the arms 13a and 13b. When the end of the pin with the pivotal portion has passed through the holes, the pivotal portion 15 will rotate under its own weight to take up a position substantially transverse to the longitudinal axis of the pin so that the latter cannot be accidentally withdrawn.

In use, chains 16 and 17, shown in broken lines, are slipped onto the pin 14 and the forward portion of the end link of each chain positioned in the appropriate space between the outer edge of the draw bar 11 and the arms 13a and 13b. The chains are thus securely coupled to the pin and cannot slide therealong, being held apart by the draw bar itself.

In the embodiment shown in FIG. 2, the locking pin 19 has one end threaded so that it can be rotated to engage the hole in the arm 13a (or 13b, as the case may be) which is correspondingly threaded.

In the embodiment partly shown in FIG. 3, a locking pin 20 is provided with a hole 21 at one end so that after it has been passed through the holes in the arms 13a and 13b, a wire-type locking clip 22 can be passed through the hole 21 to lock the pin 20 in position.

In another embodiment (not shown in the drawing) a first U-shaped bracket corresponding to the bracket 13 is fixed to one face of the draw bar 11 in the same manner as in the first embodiment (FIG. 1). A second smaller but similar U-shaped bracket is fixed to the face of the draw bar opposite to that to which the first U-shaped bracket is fixed, with the arms of the second bracket spaced inwardly apart from the corresponding arms of the first bracket 13, and being provided with holes aligned with the holes in the arms of the first bracket, so that the locking pin 14, 19 or 20 passes through both pairs of arms. Thus the end link of each chain 16, 17 is engaged by the locking pin between one arm of the first bracket and the corresponding arm of the second bracket.

In yet another embodiment (not shown), a pair of U-shaped brackets are fixed to each side of a draw bar so that the arms of each bracket are substantially parallel to the arms of the other bracket and are each provided with aligned holes which a locking pin passes.

Whilst the invention has been described with reference to three specific types of locking pin it is not limited thereto. Any type of locking pin such as a conventional bolt and nut may be used.

It will be understood that the foregoing disclosure relates only to preferred, exemplary embodiments of a draw bar, and that the invention is intended to include and cover all changes and modifications of the examples described within the scope of the invention as set forth in the appended claims as well as in the object set forth in the preamble.

What I claim is:

1. A draw bar for motor vehicles to which a trailer or the like is to be attached in a releasable manner, both by coupling means and by at least one safety chain, comprising elongated draw-bar means attachable to said motor vehicle, a pair of substantially parallel, spaced-apart arms projecting from said draw-bar means and having substantially aligned transversal holes, and a locking pin removably passed through said holes for releasable attachment of the ends of said chains.

2. A draw bar as defined in claim 1, further comprising means for holding said chain ends apart when positioned on said locking pin.

3. A draw bar as defined in claim 1, wherein one end of said locking pin has a pivotable portion normally taking up a position substantially transverse to the main portion of said locking pin but adapted to be aligned with said main portion so as to be passed through said holes for withdrawing said locking pin from said arms.

4. A draw bar as defined in claim 3, wherein said pivotable portion normally extends beyond both sides of said main portion for providing a safety lock against inadvertent withdrawal of said locking pin unless said pivotable portion is deliberately aligned with said main portion.

5. A draw bar as defined in claim 1, wherein one end of said locking pin has an external thread adapted to engage a correspondingly internal thread in one of said holes.

6. A draw bar as defined in claim 1, wherein one end of said locking pin has a transverse hole, and further comprising a wire clip removably passed through said transverse hole.

7. A draw bar as defined in claim 1, wherein said arms form a substantially U-shaped first bracket fixed to one face of said draw-bar means so that said arms are substantially parallel with but spaced-apart from the lateral edges of said draw-bar means, and wherein said locking pin is just clear of a second face of said draw-bar means opposite to said one face, when said locking in is in position in said holes.

8. A draw bar as defined in claim 7, wherein said first bracket is fixed to one side of the draw bar, and further comprising another pair of arms projecting from said draw-bar means, having transversal holes and forming a substantially U-shaped second bracket similar to said first bracket and fixed to the other side of the draw bar, said holes of the pairs of arms being all aligned for passage of said locking pin therethrough.

9. A draw bar as defined in claim 7, further comprising another pair of arms projecting from said draw-bar means, having transversal holes and forming a substantially U-shaped second bracket similar to but smaller than said first bracket and fixed to said second face, said locking pin being passed through said holes of both pairs of arms.

10. A draw bar as defined in claim 9, wherein said second bracket is inwardly from but aligned with said first bracket, said chain ends being held on said locking pin intermediate said brackets.

References Cited
UNITED STATES PATENTS

| | | | |
|---|---|---|---|
| 2,394,207 | 2/1946 | Roth. | |
| 3,123,383 | 3/1964 | Humpal | 280—457 |
| 3,132,878 | 5/1964 | De Puydt | 280—457 |
| 3,265,407 | 8/1966 | Paddock | 280—457 |

LEO FRIAGLIA, *Primary Examiner.*